April 21, 1964     O. D. LINTNER     3,129,514

LAND MEASURING CALIPER

Filed Sept. 29, 1961     2 Sheets-Sheet 1

INVENTOR.
Orval D. Lintner
BY *JRNesbitt*
Attorney

April 21, 1964     O. D. LINTNER     3,129,514
LAND MEASURING CALIPER

Filed Sept. 29, 1961     2 Sheets-Sheet 2

INVENTOR.
Orval D. Lintner
BY *J. R. Nesbitt*
Attorney

United States Patent Office 3,129,514
Patented Apr. 21, 1964

3,129,514
LAND MEASURING CALIPER
Orval D. Lintner, Rensselaer, Ind.
Filed Sept. 29, 1961, Ser. No. 141,706
1 Claim. (Cl. 33—149)

This invention relates to a land measuring device and more particularly to a registering caliper type device of simple and efficient construction.

It often is necessary and expeditious for a single individual to measure the distance between two given points on a farm or the like. This rules out the most common and accurate method of measurement by means of a calibrated tape which requires a chainman at each end. Other measuring devices operable by a lone individual include a registering wheel or a short measuring stick but these devices are not suited to measurement over rough ground and are highly inaccurate if used. A registering land caliper which may be stepped along a line to be measured is shown in U.S. Patent No. 1,117,064, issued to D. A. Landaiche. However, this device has several drawbacks which make it impractical and the object of this invention is to provide a land caliper which is simple in operation, ruggedly constructed, and above all, accurate in comparison with other one-man-operated measuring devices for use in measuring considerable distances over rough terrain.

The present device, broadly speaking, comprises a caliper with a rotatable handle to which is affixed a counter. Upon rotation of the caliper through 180 degrees by the operator gripping the handle and stepping the device along the line to be measured, the counter tongue strikes a plate fixed to the caliper legs thereby causing the counter to register. Upon a further 180 degrees rotation of the caliper legs (or one "step") the counter tongue strikes the other plate which is fixed to the caliper legs and is again actuated. The ingenious construction of this device will best be appreciated by a comparison with the device shown in the Landaiche Patent. Landaiche used reciprocable feet on the ends of his caliper legs which were connected by a fragile linkage to a counter. In the rough usage which devices of this nature receive in field use, this linkage could easily be bent to render the device inoperable. The present device requires no linkage since the counter tongue is actuated directly by two plates fixed to the caliper legs. The Landaiche handle is also rigidly secured to the legs at an angle which requires one to be a contortionist to operate the device. The present device is easily operated by firmly gripping the vertical handle and stepping the device along a line while holding the handle in a vertical position.

Other objects and advantages will be pointed out in, or be apparent from, the specifications and drawings in which.

Figure 1:
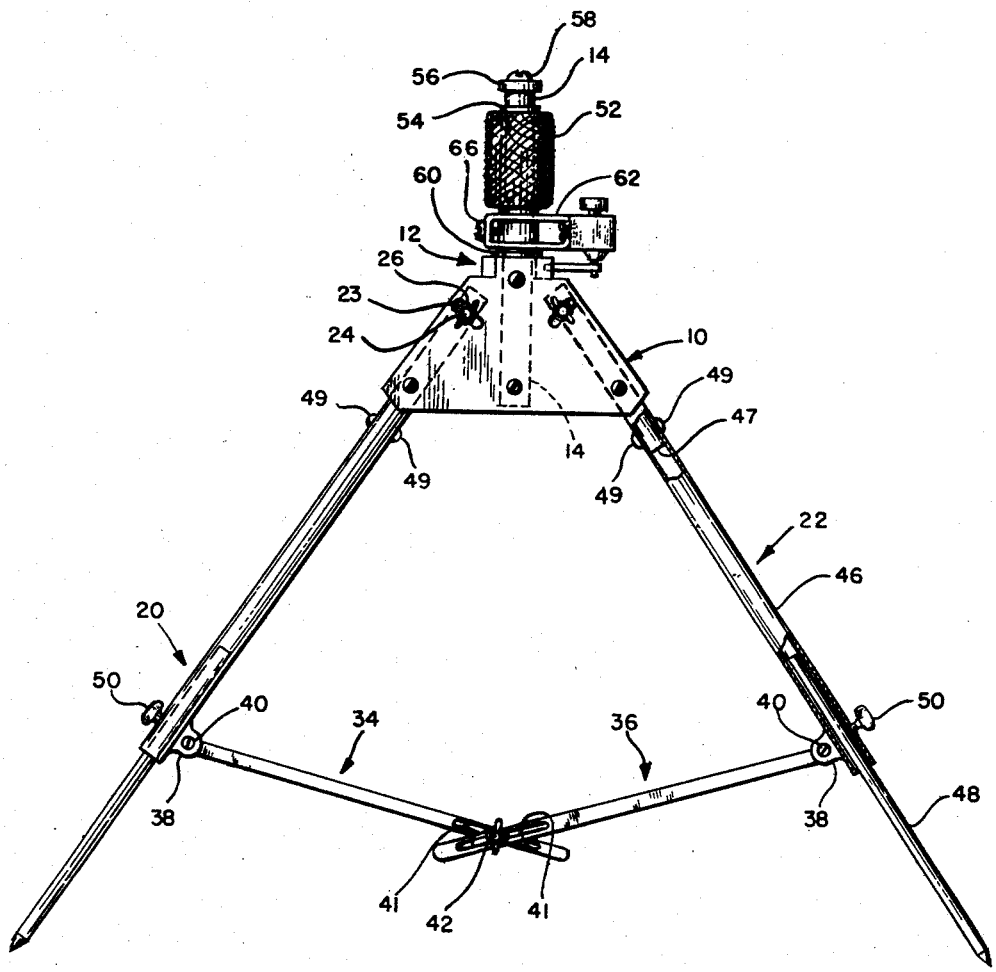
FIG. 1 is a side view of the land caliper with portions of one leg broken away to show the adjustable construction of such leg and a solid insert in the top of the leg.
Figure 3:
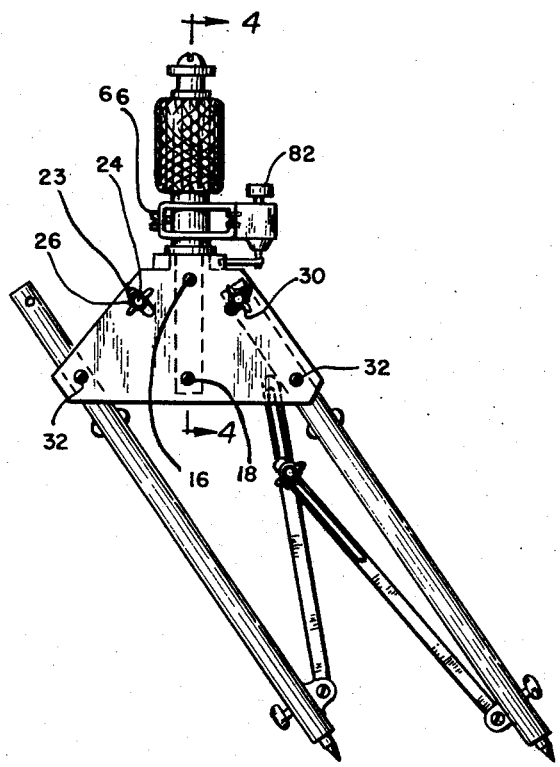
FIG. 3 is a view showing the device in folded position.
Figure 4:
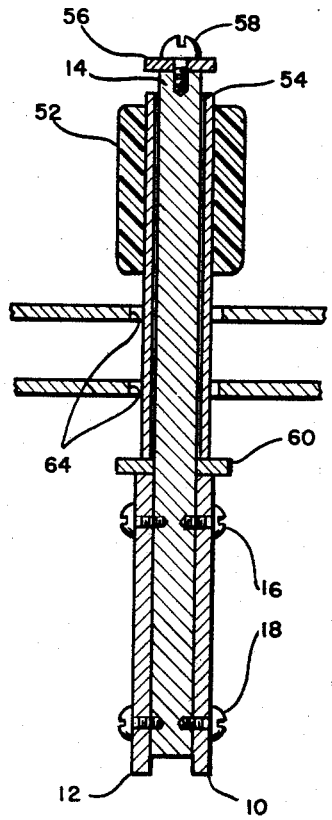
FIG. 4 is a sectional view taken on line 44 in FIG. 1.

The land caliper is comprised of a pair of identical stamped plates 10 and 12 which are reversed 180 degrees and separated by a solid pivot rod 14 which is riveted to the plates at 16 and 18. A pair of legs 20 and 22 each have one end extending between the plates and each leg is secured to the plates by a bolt 24 which passes through a washer 26, a slot 23 in one plate, an identical aligned slot in the other plate, a washer, and is held by a wingnut 30. Each leg is riveted between the plates at 32 which permits the leg to pivot at 32 so that bolt 24 moves in slot 23 and permits adjustment of the spacing between the tips of the legs. When it is desired to fold one of the legs of the device for compactness a wingnut is simply removed and the leg pivots on rivet 32 and folds as shown in FIG. 3. The spacing of the tips is accurately maintained by braces 34, 36 which are each riveted at 40 to a tab 38 on a leg. These braces each have a slot 41, and a bolt 42 passes through these slots and tightening wingnut 44 clamps the braces in position. Each leg is adjustable and has a hollow top portion 46 and a lower portion 48 having a diameter such that it is slidable within leg portion 46. A set screw 50 is used to fix the portion 48 with respect to portion 46 so that a leg of the desired length is provided as can be seen in FIG. 1 in which a section of the top leg portion is broken away. Hollow top portion 46 has a solid rod 47 secured by rivets 49 in the top end as shown in FIG. 1 to prevent bending of leg portion 46 when bolts 24 and wingnuts 30 are tightened to lock the legs in place.

The land caliper is stepped along the line to be measured by the operator gripping a handle 52 which is fixed to a sleeve 54 that fits over pivot rod 14 and is rotatable with respect thereto. Sleeve 54 is captured between a washer 56 secured to the top of rod 14 by bolt 58, and a washer 60 fastened to the top edge of plates 10 and 12. A bracket 62 has circular apertures 64 in it at top and bottom which receive sleeve 54. A set screw 66 passes through one side of the bracket and is tightened against the sleeve to hold the bracket in place. A counter 68 is fastened by bolts 70 to bracket 62. The counter includes tongue pivot 71 with an actuatable tongue 72 pivoted thereon extending toward sleeve 54. Plate 10 has a tab 74 at the top thereof and tab 74 has an edge 76 which lies in the path followed by counter tongue 72 when sleeve 54 is rotated with respect to rod 14, plates 10 and 12 and the calipher legs all of which are fixed with respect to each other.

Figure 2:
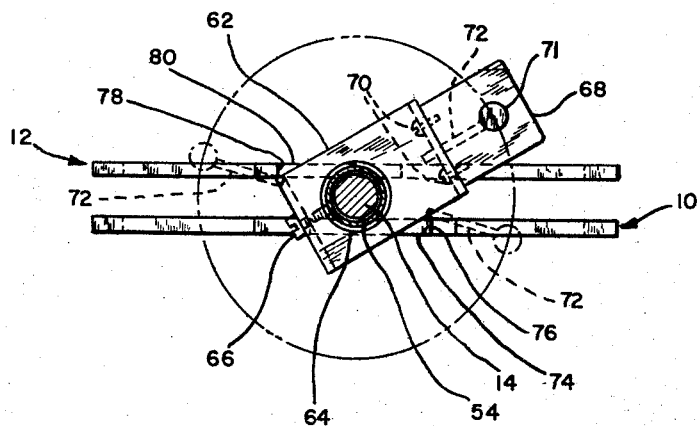
FIG. 2 is an enlarged schematic top view of the device showing positions in which the counter tongue contacts the plates in broken lines and showing the path described by the tongue pivot in broken lines.

Upon the sleeve being rotated by stepping the caliper along a line to be measured, counter tongue 72 moves to the position shown in dotted lines in FIG. 2 where it contacts edge 76 of tab 74 which actuates the counter. Upon the caliper being stepped once more the counter tongue moves to the position shown in dotted lines in FIG. 2 where it contacts edge 78 of tab 80 which again actuates the counter. Thus by setting the tips of the caliper legs a predetermined distance apart and by multiplying this known distance times the counter reading the length of the line measured is easily computed. Or, as a variation on the above, the tips of the legs may be spaced 5½ feet apart and the counter reading divided by 3 to give a reading in rods for the line measured. Upon completing the measurement the counter is then reset to zero by knob 82 and folded for compact storage if desired.

Although but one embodiment of the present invention has been illustrated and described, it will be apparent to those skilled in the art that various changes and modifications may be made therein without departing from the

I claim:

A registering caliper, comprising: a pair of legs; fastening means connecting one end of said legs together; handle means rotatably mounted on said fastening means; abutment means connected to said fastening means, said abutment means being spaced outwardly from the rotational axis of said handle means; a counter fastened to said handle means; and a tongue pivotally mounted on said counter, said tongue actuating said counter whenever said pivotal movement occurs, and said tongue contacting said abutment means to pivot said tongue and thereby actuate said counter at least once during each complete revolution of said handle means with respect to said fastening means.

References Cited in the file of this patent

UNITED STATES PATENTS

| | | |
|---|---|---|
| 314,625 | Stoddard | Mar. 31, 1885 |
| 1,117,064 | Landaiche | Nov. 10, 1914 |
| 1,194,182 | Kaplan | Aug. 8, 1916 |

FOREIGN PATENTS

| | | |
|---|---|---|
| 57,031 | Sweden | July 10, 1924 |